G. W. HOWELL.
BOLT AND NUT LOCK.
APPLICATION FILED FEB. 12, 1913.
1,206,330.
Patented Nov. 28, 1916.
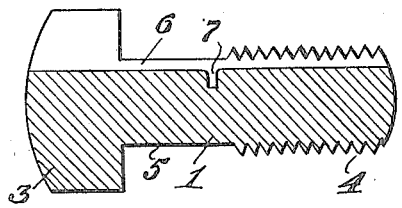
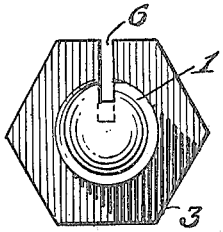
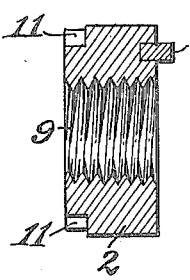
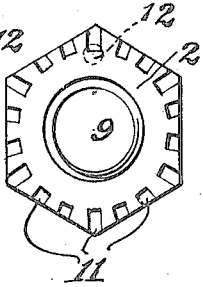
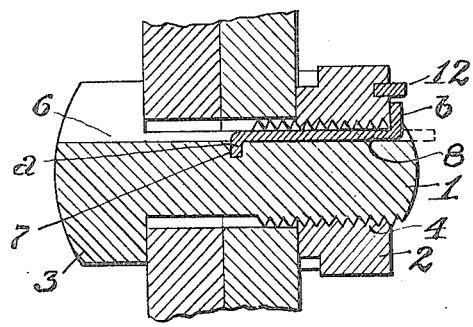
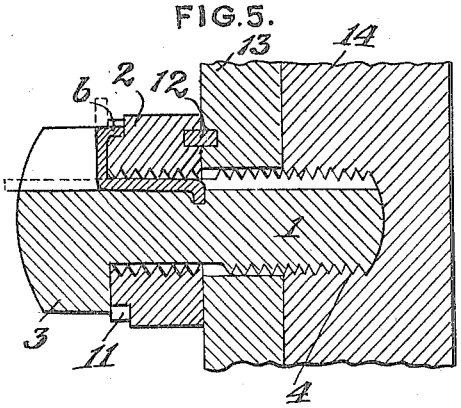
WITNESSES
INVENTOR

UNITED STATES PATENT OFFICE.

GEORGE W. HOWELL, OF GREENSBURG, PENNSYLVANIA.

BOLT AND NUT-LOCK.

1,206,330.

Specification of Letters Patent.

Patented Nov. 28, 1916.

Application filed February 12, 1913. Serial No. 747,921.

*To all whom it may concern:*

Be it known that I, GEORGE W. HOWELL, of Greensburg, in the county of Westmoreland, and State of Pennsylvania, have invented certain new and useful Improvements in Bolts and Nut-Locks, of which the following is a specification.

Among the objects of the present invention are, to provide a new and improved bolt and nut construction; coöperating locking means therefor; to provide interchangeable nut and bolt locking means; and to provide, in a device of this character, a combined nut and washer.

In the accompanying drawing, which illustrates applications of my invention, Figure 1 is a longitudinal sectional view of a bolt constructed in accordance with my invention; Fig. 1ª is an end view of the same; Fig. 2 is a vertical sectional view of a combined nut and washer; Fig. 2ª is an end view of the same; Fig. 3 is a perspective view of a locking key; Fig. 4 is a vertical sectional view of the members assembled, particularly showing the manner of locking the nut; Fig. 5 is a similar view showing the manner of locking the bolt.

Referring to the drawing, and first to the preferred form of bolt and nut shown by Figs. 1 and 2, 1 designates a bolt and 2 an engaging member or a combined nut and washer adapted to be mounted on the bolt and to coöperate therewith in the usual manner.

The bolt, as illustrated in the form of Fig. 1, comprises a head 3 and a shank portion, said shank portion being formed for a part of its length with threads 4 and for a part of its length with a smooth portion 5, the latter being disposed intermediate of the head and the threaded portion.

In addition to the parts mentioned, the bolt is provided with a longitudinally extending key-way 6 formed in the head and shank portions of the bolt, and with a radial recess 7 communicating with and extending substantially at right angles to the key-way. The key-way 6 is adapted to receive a locking key 8, and the recess 7 a bent portion of said locking key.

The combined nut and washer, as illustrated and as preferred, is formed with a centrally threaded opening 9, a series of notches 11, and is provided with a lug 12, the latter being adapted to be entered into a hole formed in a lid or other member to which the combined washer and nut is applied. Thus, Fig. 5 illustrates a member 13, which is designed to be secured to a member 14 by the bolt, provided with a hole to receive the lug 12.

Fig. 4 illustrates the bolt and nut employed for bolting the parts together in cases where the bolt extends through both of the connected parts or members, and particularly illustrates the manner of locking the nut against rotation. In this construction the locking key is placed in the longitudinally extending key-way with its bent portion *a* entered in the recess 7 of the bolt and its free end *b* extended beyond the outer face of the combined nut and washer 2. After the nut member 2 has been screwed into the desired position, the free end *b* of the locking key is then bent and forced into contact with the nut.

When it is desired to employ the bolt in the manner shown by Fig. 5, the position of the locking key is reversed, the free end being adjacent to the head of the bolt instead of away from its head as shown by Fig. 4, and the combined nut and washer is also reversed and moved onto the smooth or non-threaded portion 5 of the shank.

What I claim is:—

1. The combination with a bolt provided with a shank having a threaded portion and a smooth portion, the diameter of the smooth portion being less than that of the threaded portion, of an internally threaded reversible combined nut and washer adapted to be screwed over the threaded portion and mounted on the smooth portion of the shank and held against accidental displacement by the threads of the bolt.

2. The combination with a headed bolt provided with a shank having a threaded portion and a smooth portion between the head and threaded portion, the diameter of the smooth portion being less than that of the threaded portion, an internally threaded reversible combined nut and washer adapted to be mounted on the smooth portion of the shank, and means for locking the nut and bolt against relative rotative movement with respect to each other.

3. The combination with a headed bolt provided with a shank having a threaded portion and a smooth portion between the head and threaded portion, the diameter of the smooth portion being less than that of the threaded portion, an internally threaded reversible combined nut and washer adapted to be mounted on the smooth portion of the shank, and a locking key in a slot in the bolt and provided with a projecting end bendable over the nut.

4. In a device of the character described, the combination with a bolt having its shank formed with a threaded portion and a smooth portion and with a longitudinally extending key-way and a radial recess, of a reversible combined nut and washer adapted to be mounted in the smooth portion of the shank, and a locking key having a portion entered in the key-way and a bent portion entered in the recess, said nut and washer formed with notches and an end of the key entered in a notch.

In testimony whereof I affix my signature in presence of two witnesses.

GEORGE W. HOWELL.

Witnesses:
  W. G. DOOLITTLE,
  F. E. GAITHER.